(12) United States Patent
Cao et al.

(10) Patent No.: US 6,240,139 B1
(45) Date of Patent: May 29, 2001

(54) APPARATUS AND METHOD FOR REPEATING SIMULTANEOUSLY TRANSMITTED SIGNALS ON A SINGLE TRANSMISSION PATH

(75) Inventors: Tai Ahn Cao; Satyajit Dutta; Donna W. Luk, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,300

(22) Filed: Jul. 30, 1998

(51) Int. Cl.$^7$ ...................................... H04B 3/00
(52) U.S. Cl. .................. 375/257; 375/288; 375/220; 375/211; 370/297
(58) Field of Search .................................. 375/257, 211, 375/258, 219, 220, 288; 379/399, 414; 370/279, 276, 297, 275; 326/30, 86

(56) References Cited

U.S. PATENT DOCUMENTS

| | | |
|---|---|---|
| 4,498,166 | 2/1985 | Esposito . |
| 5,469,430 | 11/1995 | Guerin et al. . |
| 5,799,040 * | 8/1998 | Lau ....................................... 375/258 |
| 5,856,980 * | 1/1999 | Doyle ..................................... 371/5.1 |
| 5,929,896 * | 7/1999 | Goodman et al. ...................... 348/14 |

* cited by examiner

*Primary Examiner*—Chi Pham
*Assistant Examiner*—Bayard Emmanuel
(74) *Attorney, Agent, or Firm*—Russell D. Culbertson; Robert M. Carwell

(57) ABSTRACT

A repeater circuit (10) includes a decoder arrangement (34) and an encoder arrangement (33). The decoder arrangement (34) is connected to an input transmission line to receive an input encoded signal comprising a signal at one of four encoded voltage levels. Each of the four possible encoded voltage levels represents a different combination of first and second digital data signals. The decoder arrangement (34) decodes the input encoded signal to produce the first and second data signals. These first and second data signals then serve as inputs to the encoder (33) which encodes the signals into an output encoded signal. The output encoded signal comprises a signal similar to the input encoded signal but restored to account for parasitic resistance associated with the input transmission line (21).

15 Claims, 2 Drawing Sheets

APPARATUS AND METHOD FOR REPEATING SIMULTANEOUSLY TRANSMITTED SIGNALS ON A SINGLE TRANSMISSION PATH

RELATED APPLICATIONS

This application is a related to U.S. patent application Ser. No. 08/387,518 filed Feb. 13, 1995, and entitled CIRCUITRY FOR ALLOWING TWO DRIVERS TO COMMUNICATE WITH TWO RECEIVERS USING ONE TRANSMISSION LINE, the disclosure of which is hereby incorporated herein by reference.

TECHNICAL FIELD OF THE INVENTION

The present invention relates to data communications, and in particular, to a repeater circuit for repeating multiple signals which have been simultaneously transmitted on a single transmission path. The invention also encompasses a method for repeating multiple signals which have been simultaneously transmitted on a single transmission path.

BACKGROUND OF THE INVENTION

Many digital circuit applications require communications between separate circuits implemented on different integrated circuit chips. Digital signals are communicated from one chip to another through a suitable transmission line or path. As used herein, "digital signals" refers to signals which reside at one of two signal voltage levels, a "low" voltage level representing one data state and a "high" voltage level representing the opposite data state. For example, a "low" voltage level signal may represent a "0" while a "high" voltage level signal may represent a "1". Often times a system may require that multiple signals be transmitted from one chip to another in the system. In these cases in which multiple signals must be communicated, the multiple signals may be communicated on different transmission lines or time division multiplexed on a single transmission line. In time division multiplexing, the multiple signals are simply transmitted at different times on the single transmission line.

Although time division multiplexing allows multiple signals to be transmitted over a single transmission line, it requires additional complex circuitry. In order to avoid the circuit complexity occasioned by time division multiplexing, system designs have often settled for using separate transmission lines in order to support simultaneous data communications in a single direction. However, multiple transmission lines also add complexity due to the added drivers, receivers, chip pins, and signal pads which the multiple transmission lines require. It is therefore also desirable to reduce the number of transmission lines between integrated circuit chips thereby reducing the corresponding connection, transmission, and reception circuitry.

U.S. patent application Ser. No. 08/387,518 is directed to a circuit for allowing simultaneous unidirectional data communications through a single transmission line. According the system disclosed in that application, two digital data signals are encoded into a single encoded signal which represents both original digital signals. The encoded signal is transmitted through a single transmission line to a second circuit which decodes the encoded signal back into the first and second digital data signals for use by the circuit on the receiving integrated circuit chip.

All transmission lines exhibit a parasitic resistance to the transmitted signals. For relatively short transmission lines this parasitic resistance is negligible and does not affect the transmitted signals. However, as the length of the transmission line increases the parasitic resistance may increase to the point at which the transmitted signal degrades sufficiently to cause an error in reading the transmitted data. The simultaneous signal transmission arrangement disclosed in patent application Ser. No. 08/387,518 is particularly susceptible to errors caused by signal degradation due to parasitic resistance in transmission lines. Since the encoded signal described in this patent application resides at one of four voltage levels between a supply voltage and ground, relatively little signal degradation may result in an error when decoding the encoded signal back to the desired data signals.

SUMMARY OF THE INVENTION

It is an object of invention to provide a repeater circuit for repeating an encoded signal representing two distinct digital signals. Another object of invention is to provide a method for repeating such an encoded signal.

These objects are accomplished in a repeater circuit comprising a decoding arrangement and an encoder arrangement coupled between an input transmission path and an output transmission path. The decoding arrangement includes two decoders which both receive an input encoded signal representing a first data signal and a second data signal. A first decoder decodes the input encoded signal to produce the first data signal. A second decoder decodes the input encoded signal to produce the second data signal. The first and second data signals serve as inputs to the encoder arrangement which re-encodes these signals to produce an output encoded signal representing the first and second data signals. This output encoded signal is then transmitted via an output transmission path on to the next repeater circuit or a destination circuit which requires the first and second data signals. The repeater circuit according to the invention serves to restore the value of the encoded signal which may have degraded by the parasitic resistance associated with the input transmission path.

The first and second data signals each comprise digital signals having one of two signal voltage levels, a "low" voltage level or a "high" voltage level. The input and output encoded signals each comprise a signal at any one of four voltage levels. Each of the four encoder voltage levels represent a particular combination of the data signals. One encoder voltage level represents "low" first and second data signals, while another encoder voltage level represents "high" first and second data signals. Yet another encoder voltage level represents a "low" first data signal and a "high" second data signal, and a final encoder voltage level represents a "high" first data signal and a "low" second data signal.

The first decoder of the repeater circuit comprises a first differential receiver which compares the input encoded signal to a reference voltage and provides the first data signal at the differential receiver output. A second differential receiver and a non-inverting buffer make up the second decoder. The buffer receives the first data signal at the buffer input and produces a buffer output. The second receiver compares the input encoded signal to the buffer output and produces the second data signal from this comparison.

Once decoded into the first and second data signals, the two data signals are applied as inputs to the encoder portion of the repeater circuit. The encoder comprises a voltage divider arrangement having two impedance paths coupled to the output transmission path through an output node. A first impedance path includes a first driver and a first resistor. A second impedance path includes a second driver and a second resistor. The impedances of the first impedance path and the second impedance path are preselected so that the encoder produces a different one of the four encoder voltage levels at the output node in response to each different combination of first and second data signals.

In one form, the repeater circuit according to the invention is adapted to repeat an input signal representing only a single one of the first or second data signals. In this form of the invention each driver in the encoder arrangement is connected to receive a disable signal. When applied to one of the encoder drivers, the disable signal places the particular driver in a disabled or tri-state condition. The disable signal to one of the drivers also causes a compensating impedance to be applied to the remaining impedance path. The compensating impedance causes the total impedance of the remaining impedance path to match the impedance of the output transmission path.

These and other objects, advantages, and features of the invention will be apparent from the following description of the preferred embodiments, considered along with the accompanying drawings.

DESCRIPTION OF THE PREFERRED EMBODIMENTS

The following description sets forth numerous details such as voltage levels or component values, for example. These details are used to help provide a thorough understanding of the present invention. However, those skilled in the art will readily appreciate that the present invention may be practiced without such specific details. In other instances, well-known circuits have been shown in block diagram form in order not to obscure the present invention in unnecessary detail. Furthermore, details concerning timing considerations and similar considerations have been omitted in as much as such details are not necessary to obtain a complete understanding of the present invention and are, in any event, within the knowledge of those skilled in the art.

Figure 1:
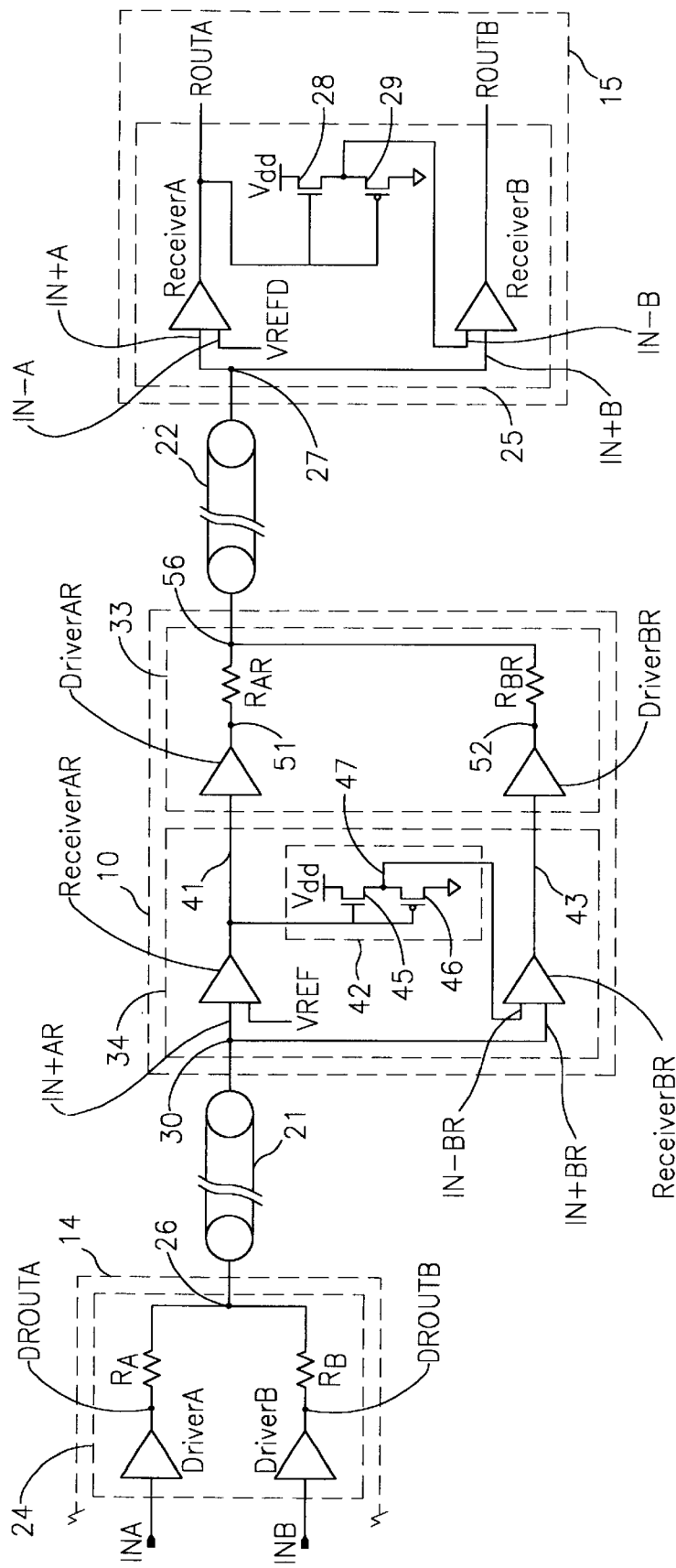
FIG. 1 is an electrical schematic diagram showing a system using a single repeater circuit embodying the principles of the invention.

Referring to FIG. 1, a repeater circuit 10 embodying the principles of the invention is used in transmitting an encoded signal from a signal source (not shown) on chip 14 to a destination chip 15. Although one repeater circuit 10 is shown for purposes of example, those skilled in the art will appreciate that more repeater circuits may be used in a particular system. The number of repeater circuits required is dependent upon the parasitic resistance of the transmission path between signal source chip 14 and the destination chip 15.

The encoded signal provided by the signal source on chip 14 is transmitted via first transmission path 21 to repeater circuit 10. Repeater circuit 10 repeats the encoded signal, as will be discussed in detail below, and transmits the repeated encoded signal via second transmission path 22 to destination chip 15.

Chips 14 and 15 are preferably implemented with complementary metal-oxide semiconductor (CMOS) circuitry, requiring a 2.5 volt power supply for operation ($V_{dd}$=2.5 volts). Chips 14 and 15 may be portions of an overall circuit design for a system such as a computer. In the design, it is necessary for the circuitry implemented in signal source chip 14 to provide two signals to the circuitry implemented in destination chip 15. Repeater circuit 10 is required because a single transmission path between chips 14 and 15 would be sufficiently long to have a significant parasitic resistance. The parasitic resistance associated with the one long transmission path would cause the transmitted signal to degrade excessively and could cause the transmitted signal to be misinterpreted.

In most systems, each repeater circuit will be implemented on separate chips from the source and destination chips 14 and 15, respectively. However, it is possible that a repeater circuit embodying the principles of the invention could be implemented on a chip which also includes either the signal source or the destination, or both. In any event, repeater circuit 10 is preferably implemented in CMOS circuitry using the same power supply level as that used in chips 14 and 15.

Signal source chip 14 includes an encoder 24. This encoder 24 is described in detail in the related application Ser. No. 08/387,518, and operates to encode two separate digital data signals to produce an encoded signal representing the two digital signals. Destination chip 15 includes decoder 25 for decoding the encoded signal to produce the original two digital data signals originating at signal source chip 14. Decoder 25 is also disclosed in detail in the related application. Both the encoder 24 associated with signal source chip 14 and the decoder 25 associated with destination chip 15 are described in this application only to aid in the understanding of the repeater circuit 10 of the present invention.

In the encoder 24 associated with chip 14, Driver A receives a first digital signal A on input line INA, while Driver B receives a second digital signal B on input line INB. INA and INB are coupled to various circuitry (not shown) within chip 14. Digital signals A and B are required by various circuitry (also not shown) which is coupled to output lines ROUTA and ROUTB on destination chip 15. Encoder 24 on chip 14, the repeater circuit 10, and decoder 25 on destination chip 15 cooperate to provide the digital signals A and B at output lines ROUTA and ROUTB, respectively.

In encoder 24, Drivers A and B drive digital signals A and B through resisters $R_A$ and $R_B$, respectively, to common node 26. Common node 26 is coupled to first transmission path 21 between signal source chip 14 and repeater circuit 10. Node 26 may represent a chip pin or signal pad which couples chip 14 to the first transmission path 21. Such a connection may be a solder-ball connection, commonly referred to in the industry as a C4 connection. Resisters $R_A$ and $R_B$ may be located on-chip as indicated in FIG. 1 or off-chip.

The values of $R_A$ and $R_B$ are chosen so that the total impedance of the two parallel input paths equals the impedance $Z_0$ of first transmission path 21. Driver A has an impedance of $Z_{DA}$, while Driver B has an impedance of $Z_{DB}$. $Z_{DA}$, $Z_{DB}$, $R_A$ and $R_B$ are chosen such that: $(Z_{DA}+R_A)//(Z_{DB}+R_B)=Z_0$ and $(Z_{DA}+R_A)/(Z_{DB}+R_A)=1/2$ (approximately). Typical values for these impedances are $Z_{DA}+R_A$=75 ohms and $Z_{DB}+R_B$=150 ohms. With the impedances chosen to satisfy both of these equations, the encoder 24 functions as a voltage divider in which voltages from the supply voltage $V_{dd}$ (of Drivers A and B) to ground are divided into three nearly equal compartments, or four voltage levels. As will be discussed in detail below, each of these four voltage levels is used to represent a different combination of values for the digital input signals A and B. Since the two digital signals are represented by a single encoded signal at one of the four voltage levels produced by encoder 24, the two digital signals may be simultaneously transmitted in the form of the single encoded signal on a single transmission path.

Decoder circuit 25 on destination chip 15 includes an input node 27, which may also comprise a C4 connection, coupled to second transmission path 22. Decoder circuit 25 also includes Receivers A and B, and a non-inverting buffer comprising N-type field effect transistor (FET) 28 and P-type FET 29. Input node 27 is coupled to the positive input IN+A of Receiver A and to the positive input IN+B of Receiver B. The negative input IN–A of Receiver A is coupled to a constant reference voltage VREFD which, in the illustrated example of the invention comprises a 1.25 volt signal. The output of Receiver A is coupled to output line ROUTA and is also coupled to the input of the non-inverting buffer made up of N-type FET 28 and P-type FET 29 connected in series between the supply voltage $V_{dd}$ (2.5 volts in this example) and ground. The non-inverting buffer has its output coupled to the negative input IN–B of Receiver B. Finally, the output of Receiver B is coupled to output line ROUTB.

First transmission path 21 forms an input path to the repeater circuit 10 and is coupled to the repeater circuit at node 30, which may also be a C4 connection. Repeater circuit 10 includes an encoder 33 and a decoder arrangement 34 which includes a first decoder comprising Receiver AR and a second decoder including Receiver BR. Receivers AR and BR each preferably comprise a suitable differential amplifier. Node 30 is coupled to the positive input IN+AR of Receiver AR. The negative input IN–AR of Receiver AR is connected to receive a reference voltage VREF which, in this illustrated example of the invention, comprises a constant 1.25 volt signal. The output of Receiver AR is coupled to node 41 which comprises a first input to encoder 33. The output of Receiver AR is also coupled to the input of a non-inverting buffer circuit 42. Non- inverting buffer circuit 42 along with Receiver BR form the second decoder. Buffer circuit 42 includes an N-type FET 45 and a P-type FET 46 coupled in series between the supply voltage $V_{dd}$, 2.5 volts in this example, and ground. The output 47 of buffer circuit 42 is coupled to the negative input IN–BR of Receiver BR while the positive input IN+BR of Receiver BR is coupled to input node 30. The output of Receiver BR at node 43 provides a second input to encoder circuit 33.

The encoder arrangement 33 of repeater circuit 10 has a structure similar to the encoder circuit 24 associated with signal source chip 14. A first driver, Driver AR, drives the signal at its input 41 to driver output node 51 and through a first resistor, Resistor $R_{AR}$. A second driver, Driver BR, drives the signal at its input 43 to driver output node 52 and through a second resistor, Resistor $R_{BR}$. Resistors $R_{AR}$ and $R_{BR}$ are coupled to common output node 56, which is coupled to second transmission path 22. The second transmission path 22 comprises an output path for the repeater circuit 10. Output node 56 may represent the chip pin or signal pad which connects the chip on which repeater circuit 10 is implemented to transmission path 22. Again, the connection may preferably be a C4 connection. Also, although first and second resistors $R_{AR}$ and $R_{BR}$ are shown as being implemented on-chip, they may be located off-chip within the scope of the invention.

The values of resistors $R_{AR}$ and $R_{BR}$ are, similarly to the values of resistors $R_A$ and $R_B$ of encoder 24, chosen so that the total impedance of the two parallel paths which join at output node 56 equals the impedance $Z_1$ of second transmission path 22. Where the impedance values of Driver AR and Driver BR are $Z_{DAR}$ and $Z_{DBR}$, respectively, $Z_{DAR}$, $Z_{DBR}$, $R_{AR}$ and $R_{BR}$ are chosen such that: $(Z_{DAR}+R_{AR})//(Z_{DBR}+R_{BR})=Z_1$ and $(Z_{DAR}+R_{AR})/(Z_{DBR}+R_{BR})=1/2$ (approximately). Typical values for these impedances are $Z_{DAR}+R_{AR}$=75 ohms and $Z_{DBR}+R_{BR}$=150 ohms. Similar to encoder 24 of signal source chip 14, encoder 33 of the repeater circuit 10 according to the invention functions as a voltage divider in which voltages from the supply voltage $V_{dd}$ to ground are divided into three nearly equal compartments, or four voltage levels. Each voltage level represents an encoded combination of the digital input signals A and B.

In operation, the encoder 24 associated with signal source chip 14 produces an encoded signal representing the digital data signals A and B and transmits this encoded signal along first transmission path 21. This encoded signal represents an input signal to repeater circuit 10. The decoder arrangement 34 of repeater circuit 10 decodes the input encoded signal back into the digital signals A and B. Once the original digital data signals are reproduced, the encoder portion 33 of repeater circuit 10 re-encodes the two data signals A and B back into an encoded signal, similarly to encoder 24, and transmits the encoded signal to the destination chip 15 through second transmission path 22. The decoder arrangement 25 at destination chip 15 decodes this encoded signal and produces the digital signals A and B at outputs ROUTA and ROUTB, respectively. For the two distinct digital input signals A and B, the decoder arrangement 34 of repeater circuit 10 operates in one of four modes:

Mode 1—Both signals A and B comprise a logical "1".

Mode 2—Both signals A and B comprise a logical "0".

Mode 3—Signal A comprises a logical "0" and signal B comprises a logical "1".

Mode 4—Signal A comprises a logical "1" and signal B comprises a logical "0".

For each of these modes or alternatives, Table 1 shows the voltage levels that would appear on the various nodes of both the encoder 24 associated with signal source chip 14 and the decoder arrangement 34 of repeater circuit 10, assuming a supply voltage $V_{dd}$ equal to 2.5 volts.

TABLE 1

| | CHIP 14 | | | | CHIP 10 | | | | | | |
|---|---|---|---|---|---|---|---|---|---|---|---|
| MODE | DROUTA | DROUTB | Node 26 | XLINE 21 | Node 30 | IN + AR | IN – AR | Node 41 | IN + BR | IN – BR | Node 43 |
| 1 | 2.5 | 2.5 | 2.5 | 2.5 | 2.5 | 2.5 | 1.25 | 2.5 | 2.5 | 1.8 | 2.5 |
| 2 | 0.0 | 0.0 | 0.0 | 0.0 | 0.0 | 0.0 | 1.25 | 0.0 | 0.0 | 0.6 | 0.0 |

TABLE 1-continued

| | CHIP 14 | | | | CHIP 10 | | | | | |
|---|---|---|---|---|---|---|---|---|---|---|
| MODE | DROUTA | DROUTB | Node 26 | XLINE 21 | Node 30 | IN + AR | IN − AR | Node 41 | IN + BR | IN − BR | Node 43 |
| 3 | 0.0 | 2.5 | 0.83 | 0.83 | 0.83 | 0.83 | 1.25 | 0.0 | 0.83 | 0.6 | 2.5 |
| 4 | 2.5 | 0.0 | 1.67 | 1.67 | 1.67 | 1.67 | 1.25 | 2.5 | 1.67 | 1.8 | 0.0 |

In Mode 1, both Driver A and Driver B are transmitting a logical "1", which results in a voltage level of 2.5 volts at the output of each driver, DROUTA and DROUTB. This 2.5 volt signal is also present at node 26, along first transmission path 21 (XLINE 21 in Table 1), and at input node 30 of the repeater circuit. In repeater circuit 10, this 2.5 volt signal is supplied to the positive input IN+AR of Receiver AR and, since this signal is greater than the 1.25 volt reference voltage VREF at the negative input, Receiver AR produces an output signal of 2.5 volts. This 2.5 volt signal comprises the first data signal, signal A, which is a logical "1". The 2.5 volt signal comprising the first data signal is also supplied to the gate electrodes of FET devices 45 and 46 resulting in a signal at the buffer output 47 of 1.8 volts (2.5 volts minus a threshold voltage of 0.7 volts for device 45). This 1.8 volt output signal from the buffer circuit 42 is applied to the negative input IN−BR of Receiver BR. Since the resulting voltage level of 1.8 volts is less than the 2.5 volt input encoded signal applied to the positive input IN+BR of Receiver BR through input node 30, Receiver BR produces an output signal of 2.5 volts. This 2.5 volt signal comprises the logical "1" data signal, signal B.

In Mode 2, both Drivers A and B associated with the encoder 24 on signal source chip 14 drive a logical "0" producing an encoded signal at 0.0 volts. This encoded signal of 0.0 volts appears at node 26, the first transmission path 21, and input node 30 to repeater circuit 10. Since the reference voltage VREF of 1.25 volts is greater than the input encoded signal 0.0 volts, Receiver AR of repeater circuit 10 produces a 0.0 voltage output corresponding to a logical "0" and comprising the first data signal, signal A. This 0.0 volt output from Receiver AR is also applied to the input of buffer circuit 42. At this 0.0 volt input, the output of buffer circuit 42 at node 47 falls to the threshold voltage of P-type device 46 which, in this example, is 0.6 volts. This 0.6 volt output from buffer circuit 42 is applied to the negative input IN−BR of Receiver BR and compared to the input encoded signal at 0.0 volts applied to the positive input IN+BR of Receiver BR. Since this 0.6 volt signal is greater than the 0.0 volt input encoded signal, Receiver BR produces an output of 0.0 volts, representing the logical "0" second data signal, signal B.

In Mode 3, Driver A of encoder 24 drives a logical "0" while Driver B drives a logical "1". With the selected values for resistors $R_A$ and $R_B$, this results in a voltage signal of 0.83 volts at node 26, first transmission path 21, and input node 30 of repeater circuit 10. Receiver AR of repeater circuit 10 receives this input encoded signal of 0.83 volts at its positive input IN+AR and compares the voltage to reference voltage VREF of 1.25 volts. Since the signal at the positive input IN+AR of Receiver AR is less than the reference voltage VREF, the first receiver produces a 0.0 volt output representing the logical "0" first data signal, signal A. The 0.0 volt signal comprising the first data signal is applied to the input of the buffer circuit 42 causing the buffer circuit output at node 47 to fall to the threshold voltage of the P-type device 46, which again in this example is 0.6 volts. This 0.6 volt output from the buffer circuit 42 is applied to the negative input IN−BR of Receiver BR and compared to the 0.83 volt input encoded signal applied to the positive input IN+BR of Receiver BR. Since the 0.83 volt input encoded signal at the positive input of Receiver BR is greater than the 0.6 volt signal applied to the negative input, Receiver BR produces a 2.5 volt output signal representing the logical "1" second data signal, signal B.

In Mode 4, Driver A of encoder 24 drives a logical "1" while Driver B drives a logical "0". With the selected values of resistors $R_A$ and $R_B$, the 2.5 volt logical "1" output of Driver A and 0.0 volt logical "0" output of Driver B produce a 1.67 volt signal at node 26, the first transmission path 21, and at input node 30 to repeater circuit 10. Receiver AR compares this 1.67 volt input encoded signal to the 1.25 volt reference signal VREF and, since the input encoded signal is greater, produces a 2.5 volt or logical "1" output as the first data signal, signal A. The 2.5 volt output of Receiver AR is applied at the input of buffer circuit 42, biasing P-type device 46 to a non-conductive state and N-device 45 to a conductive state. Thus, the output 47 of buffer 42 comprises a 1.8 volt signal resulting from the 2.5 volt supply voltage minus the 0.7 volt threshold voltage of N-type device 45. Receiver BR compares this 1.8 volt signal at its negative input IN−BR to the 1.67 volt input encoded signal applied to its positive input IN+BR. Since the 1.8 volt signal at the negative input of Receiver BR is greater than the 1.67 volt signal at the positive input, Receiver BR produces a 0.0 volt output representing a logical "0" second data signal, signal B.

In each of these modes of operation, the decoder arrangement 34 of repeater circuit 10 reproduces the original digital data signals, signals A and B, at nodes 41 and 43. Encoder 33 included in repeater circuit 10 receives these two digital signals as inputs similarly to encoder 24 of signal source chip 14. Thus the encoder arrangement 33 of repeater 10 reproduces or repeats the encoded signal at its output node 56, on second transmission path 22, and the input node 27 associated with destination chip 15. Decoder 25 of destination chip 15 operates in four modes identical to the decoder arrangement 34 included in the repeater circuit 10. Table 2 gives the voltages at the various nodes of the repeater circuit encoder 33 and destination chip decoder 25 in response to input signals A and B at the signal source chip 14 and reproduced at nodes 41 and 43 as described above. In Mode 1, input signals A and B both comprise a logical "1" and are reproduced by the repeater circuit decoder arrangement 34 as 2.5 volt signals at nodes 41 and 43 which are the inputs to Drivers AR and BR, respectively. In Mode 2, input signals A and B both comprise a logical "0" and produce 0.0 volt signals at decoder output nodes 41 and 43. Mode 3 comprises a logical "0" signal A producing a 0.0 volt signal at decoder output node 41, and a logical "1" signal B producing a 2.5 volt signal at output node 43. Finally, Mode 4 comprises a logical "1" signal A and logical "0" signal B, producing a 2.5 volt signal at node 41 and a 0.0 volt signal at node 43.

TABLE 2

| | CHIP 10 | | | | CHIP 15 | | | | | | |
|---|---|---|---|---|---|---|---|---|---|---|---|
| MODE | Node 51 | Node 52 | Node 56 | XLINE 22 | Node 27 | IN + A | IN − A | ROUTA | IN + B | IN − B | ROUTB |
| 1 | 2.5 | 2.5 | 2.5 | 2.5 | 2.5 | 2.5 | 1.25 | 2.5 | 2.5 | 1.8 | 2.5 |
| 2 | 0.0 | 0.0 | 0.0 | 0.0 | 0.0 | 0.0 | 1.25 | 0.0 | 0.0 | 0.6 | 0.0 |
| 3 | 0.0 | 2.5 | 0.83 | 0.83 | 0.83 | 0.83 | 1.25 | 0.0 | 0.83 | 0.6 | 2.5 |
| 4 | 2.5 | 0.0 | 1.67 | 1.67 | 1.67 | 1.67 | 1.25 | 2.5 | 1.67 | 1.8 | 0.0 |

Thus, as shown in Tables 1 and 2, the input digital data signals A and B are simultaneously transmitted through the first transmission path 21, repeater circuit 10, and finally the second transmission path 22 and are reproduced at outputs ROUTA and ROUTB of destination chip 15.

It will be noted that in a static state during Modes 3 and 4, current flow through resistors $R_{AR}$ and $R_{BR}$ in repeater circuit 10 is given by: 2.5V/(75+150)ohms=11 milliamps. Taking this into consideration, the design of the circuitry should consider correct line width, vias, and contacts in order to make the circuit reliable.

Although the invention is described above for the case in which the impedance $Z_0$ of first transmission line 21 is equal to the impedance $Z_1$ of second transmission line 22, the invention is not limited to this situation. Rather, the impedance $Z_1$ of second transmission line 22 may be higher or lower than impedance $Z_0$ of line 21. This characteristic of the invention is important because impedance often varies from one transmission medium to the next in a system. For example, signals may need to be transmitted from a circuit card to a multiple chip module ("MCM") mounted on the circuit card. The impedance of the circuit card transmission line may be 75 ohms, while the impedance of the transmission line in the MCM may be 40 ohms, for example. Referring to FIG. 1, first transmission line 21 may comprise a transmission line of the circuit card, while second transmission line 22 may comprise a transmission line of the MCM. Assuming the impedance $Z_1$ of second transmission line 22 is 40 ohms, the impedance $Z_{DAR}$ of Driver AR and resistor $R_{AR}$ are chosen such that $Z_{DAR}+R_{AR}=60$ ohms, and impedance $Z_{DBR}$ of Driver BR and resistor $R_{BR}$ are chosen such that $Z_{DBR}+R_{BR}=120$ ohms. These values satisfy the conditions: $(Z_{DAR}+R_{AR})//(Z_{DBR}+R_{BR})=Z_1$ and $(Z_{DAR}+R_{AR})/(Z_{DBR}+R_{BR})=1/2$.

Figure 2:
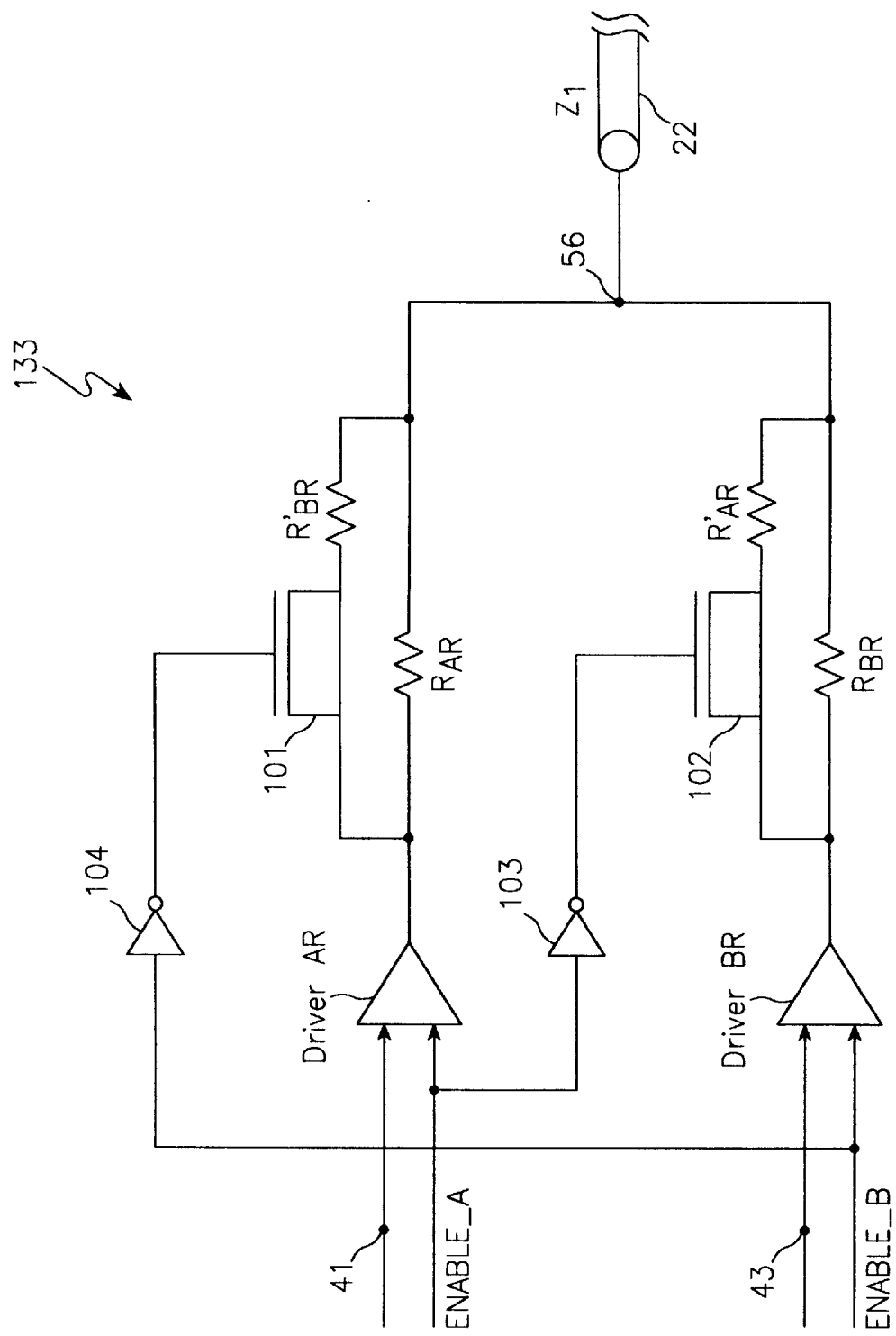
FIG. 2 is an electrical schematic diagram illustrating an alternate form of the encoder arrangement for a repeater circuit embodying the principles the invention.

In certain situations it may be necessary or desirable for signal source chip 14 to transmit to destination chip 15 only a single digital signal, either signal A or signal B. The related application Ser. No. 08/387,518 discloses an arrangement in which either one or the other digital signal may be transmitted through the signal encoding and decoding arrangement. FIG. 2 illustrates an encoder arrangement 133 which may be used in place of encoder 33 to accommodate single signal transmission through a repeater circuit embodying the principles of the invention.

Similarly to encoder 33 shown in FIG. 1, encoder 133 includes Driver AR and Resistor $R_{AR}$ forming one impedance path, and Driver BR and Resistor $R_{BR}$ forming a parallel impedance path. The two paths join at common node 56 coupled to second transmission path 22 also shown in FIG. 1. Encoder 133 also includes a compensating impedance provided by Resistor $R'_{BR}$ connected in parallel with Resistor $R_{AR}$, and a compensating impedance provided by Resistor $R'_{AR}$ connected in parallel with Resistor $R_{BR}$. Current through Resistor $R'_{BR}$ is controlled by N-type FET 101 while current through Resistor $R'_{AR}$ is controlled by N-type FET 102.

Driver AR includes an enable input ENABLE__A and Driver BR includes a similar enable input ENABLE__B. The signal on ENABLE__A is inverted with inverter 103 and this inverted signal is applied to the gate electrode of FET 102. Similarly, the signal on ENABLE__B is inverted with inverter 104 and this inverted signal is applied to the gate electrode of FET 101. A "low" signal on either of the enable lines operates to disable the particular driver by placing it in a tri-state condition. Disabling one of the Drivers AR or BR leaves the remaining driver to continue to transmit the desired single data signal. Also, a disabling "low" signal to one of the Drivers AR or BR operates to bias the FET 101 or 102 associated with the opposite impedance path, adding the compensating impedance $R'_{AR}$ or $R'_{BR}$ to match the impedance of the second transmission path 22. The enable inputs ENABLE__A and ENABLE__B, together with the respective inverters 103 and 104, FETs 101 and 102, and resistances $R'_{AR}$ and $R'_{BR}$, provide disabling arrangements for disabling one driver and enabling the other driver to transmit the respective single data signal.

For example, when a first driver disable "low" voltage level signal is applied at ENABLE__A, and a "high" voltage level signal is applied at ENABLE__B, Driver AR is placed in a tri-state condition and Driver BR is enabled to drive the data signal, signal B, at the input node 43. The "low" signal at ENABLE__A is inverted at inverter 103 and the resulting "high" signal biases N-type device 102 to conduct, adding Resistor $R'_{AR}$ to match the impedance on this single signal path with impedance $Z_1$ of second transmission path 22.

When it is desired for the repeater circuit 10 to repeat only Signal A, ENABLE__A carries a "high" voltage level signal while ENABLE__B carries a second driver disable "low" voltage level signal to tri-state Driver BR. The "low" ENABLE__B signal is inverted at inverter 104, producing a "high" voltage level signal to bias N-type device 101 to conduct. This condition connects the compensating impedance provided by Resistor $R'_{BR}$ at the output of Driver AR so that the total impedance in the path through Driver AR and Resistors $R_{AR}$ and $R'_{BR}$ matches the impedance of second transmission path 22.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. An apparatus for repeating an encoded signal representing simultaneously transmitted first and second data signals, the apparatus comprising:

(a) a first decoder coupled to an input transmission path for receiving an input encoded signal and decoding the input encoded signal into the first data signal;

(b) a second decoder coupled to the input transmission path for receiving the input encoded signal and decoding the input encoded signal into the second data signal; and (c) an encoder coupled to the first decoder and to the second decoder for receiving the first data signal and the second data signal and for encoding the first data signal and second data signal into an output encoded signal on a single output transmission path, the output encoded signal comprising a signal representing the first and second data signals.

2. The apparatus of claim 1 wherein the first and second data signals may each comprise one of two signal voltage levels, and wherein the input encoded signal and the output encoded signal each comprise one of four encoded voltage levels.

3. The apparatus of claim 2 wherein the encoder comprises:

(a) a first encoder path connected to an encoder output node and having a first impedance;

(b) a second encoder path connected to the encoder output node and having a second impedance; and (c) the first and second impedances are selected to produce the output encoded signal at the encoder output node at one of the four encoder voltage levels upon receipt of a combination of the two signal voltage levels at inputs to the first and second encoder paths.

4. The apparatus of claim 1 wherein the encoder comprises:

(a) a first driver connected to receive the first data signal from the first decoder;

(b) a first resistor connected in series with the first driver;

(c) a second driver connected to receive the second data signal from the second decoder; and (d) a second resistor connected and series with the second driver.

5. The apparatus of claim 1 wherein the first decoder comprises:

(a) a first differential receiver having one input connected to the input transmission path and a second input connected to receive a reference signal.

6. The apparatus of claim 1 wherein the second decoder utilizes the first data signal to decode the input encoded signal into the second data signal.

7. The apparatus of claim 6 wherein the second decoder comprises:

(a) a buffer circuit having an input connected to receive the first data signal from the first decoder; and (b) a second differential receiver having one input connected to receive an output of the buffer circuit and a second input connected to the input transmission path.

8. The apparatus of claim 1 wherein the first decoder, the second decoder, and the encoder are each implemented on a single integrated circuit chip.

9. The apparatus of claim 4 wherein the encoder further comprises:

(a) a first signal disabling arrangement for placing the first driver in a tri-state condition and for adding a first compensating impedance to an output of the second driver in response to a first driver disable signal; and (b) a second signal disabling arrangement for placing the second driver in a tri-state condition and for adding a second compensating impedance to an output of the first driver in response to a second driver disable signal.

10. A method for repeating an encoded signal representing simultaneously transmitted first and second data signals, the method comprising steps of:

(a) receiving an input encoded signal representing a first data signal and a second data signal simultaneously transmitted on an input transmission path;

(b) decoding the input encoded signal into the first data signal;

(c) decoding the input encoded signal into the second data signal; and (d) encoding the first data signal and the second data signal into an output encoded signal on a single output transmission path, the output encoded signal representing the first and second data signals.

11. The method of claim 10 wherein the first and second data signals may each comprise one of two signal voltage levels, and wherein the input encoded signal and the output encoded signal each comprise one of four encoded voltage levels.

12. The method of claim 10 wherein the steps of encoding the first data signal and the second data signal comprise:

(a) subjecting the first data signal to a first impedance;

(b) subjecting the second data signal to a second impedance; and (c) selecting the first impedance and second impedance so that the output encoded signal is at one of the four voltage levels in response to the first data signal at one of the two signal voltage levels and the second data signal at one of the two signal voltage levels.

13. The method of claim 12 further comprising the steps of:

(a) producing the first impedance with a first driver and a first resistor; and (b) producing the second impedance with a second driver and a second resistor.

14. The method of claim 10 wherein the step of decoding the input encoded signal into the first data signal comprises:

(a) comparing the input encoded signal to a reference signal.

15. The method of claim 10 wherein the step of decoding the input encoded signal into the second data signal comprises the steps of:

(a) producing a buffer output signal from the first data signal; and (b) comparing the input encoded signal to the buffer signal.

* * * * *